Nov. 22, 1927.
J. A. WILLIAMS
1,650,477
REVERSIBLE AEROPLANE PROPELLER
Filed May 29, 1924      2 Sheets-Sheet 1
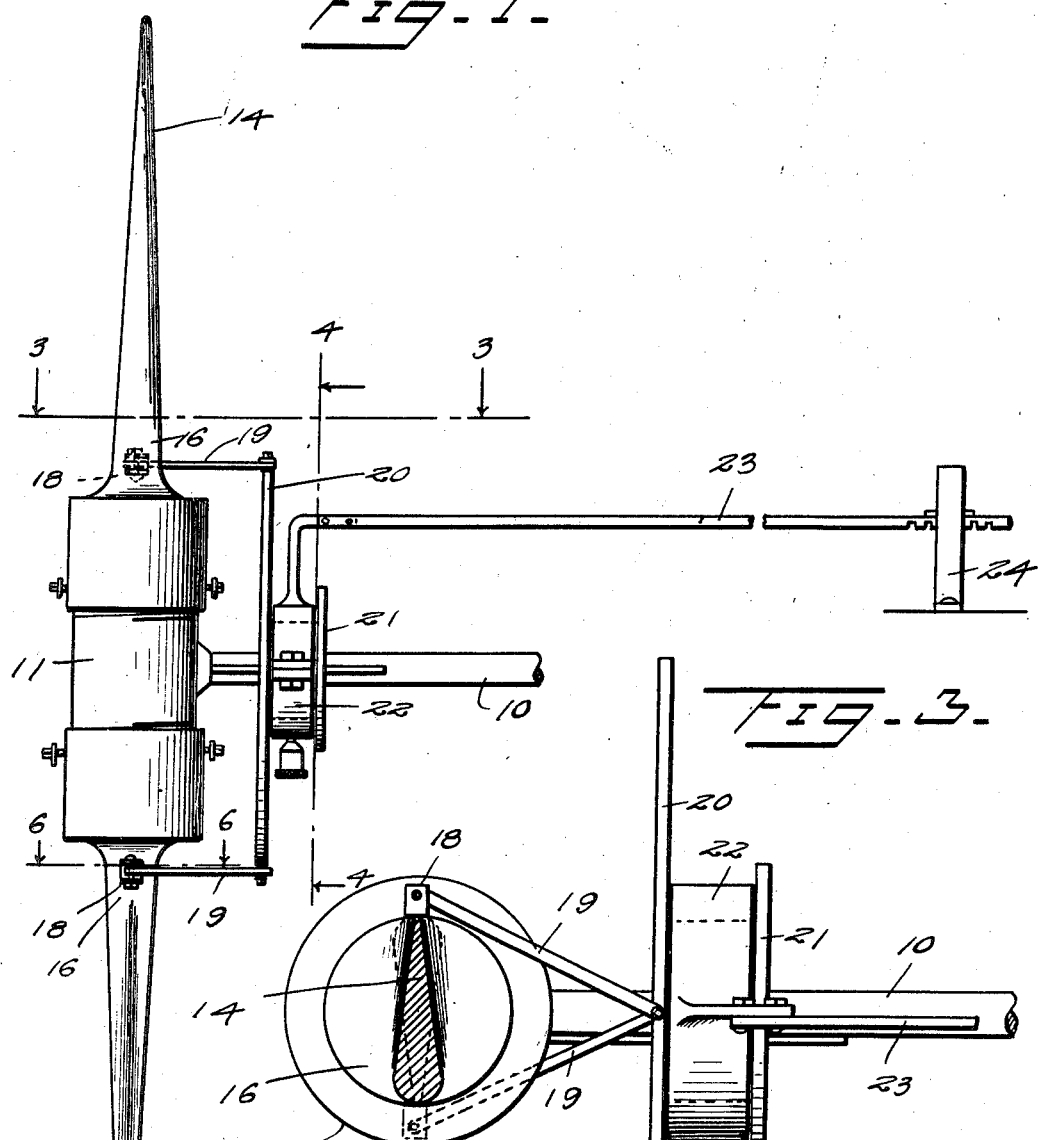
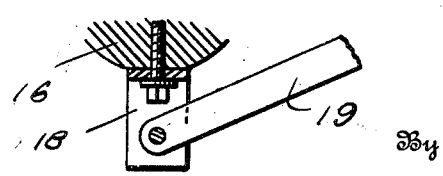
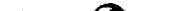

Nov. 22, 1927.　　　　　　　　　　　　　　1,650,477
J. A. WILLIAMS
REVERSIBLE AEROPLANE PROPELLER
Filed May 29, 1924　　　　2 Sheets-Sheet 2
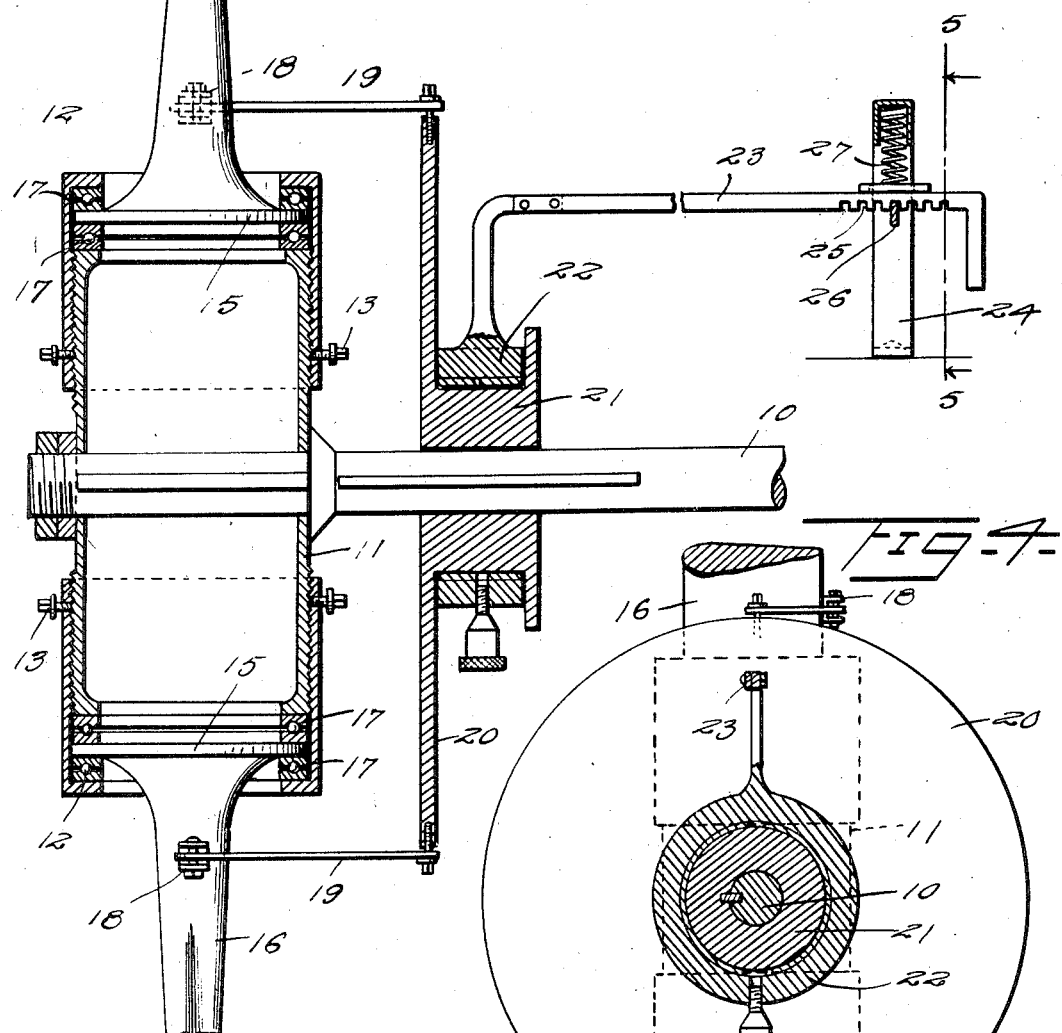
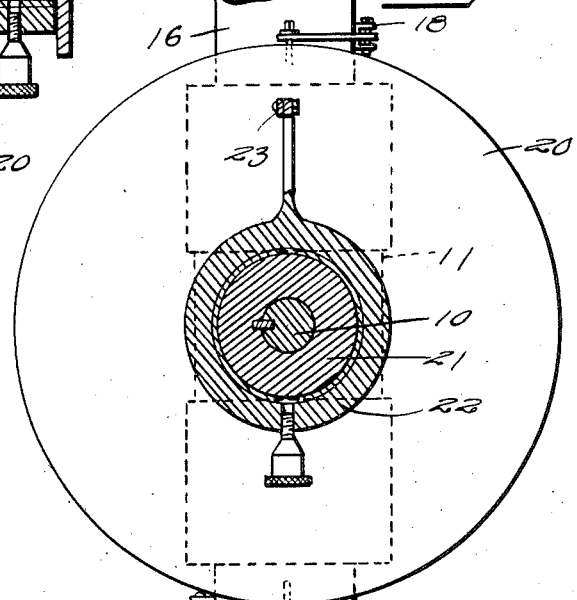
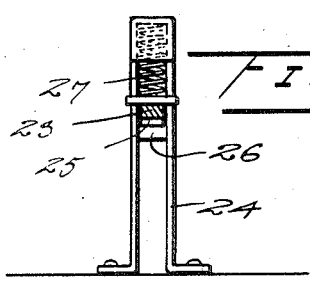

Patented Nov. 22, 1927.

1,650,477

UNITED STATES PATENT OFFICE.

JAMES A. WILLIAMS, OF WEST, TEXAS.

REVERSIBLE AEROPLANE PROPELLER.

Application filed May 29, 1924. Serial No. 716,703.

The invention relates to propellers and to such as are designed particularly for flying machines and has for its object the provision of a propeller the blades of which may be readily adjusted to any desired angle either forwardly or rearwardly or to a neutral position whereby the propeller may rotate without imparting any movement to the aircraft either forwardly or rearwardly.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view of a reversible propeller for aircraft embodying the invention;

Figure 2 is an enlarged detail sectional view showing more clearly the construction and relative arrangement of the parts;

Figure 3 is a horizontal section on the line 3—3 of Figure 1;

Figure 4 is a sectional view on the line 4—4 of Figure 1, looking in the direction of the arrows;

Figure 5 is a sectional detail on the line 5—5 of Figure 2; and

Figure 6 is a sectional detail on the line 6—6 of Figure 1.

Corresponding and like parts are referred to in the following description and designated in the several views of the drawings by like reference characters.

The propeller shaft 10 has a tubular cross head 11 fast to an end thereof so as to rotate therewith. Retaining caps 12 are threaded upon the ends of the tubular cross head 11 and are secured in the required adjusted position by means of set screws 13 threaded into openings formed in the sides thereof. Propeller blades 14 have circular flanges 15 at the inner ends of their arms 16 and these flanges are confined within the ends of the cross head 11 between ball bearings 17 so as to turn freely. The propeller blades consist preferably of metal such as steel or aluminum and are light, durable and strong and are admirably adapted for warcraft as they are not susceptible to being pierced or splintered by a bullet or other missile. A lug 18 projects laterally from each of the arms 16 and the lugs of opposite propeller blades are reversely disposed so that movement of the lugs in the same direction will produce an opposite movement of the propeller blades which is essential as will be readily understood.

Links 19 connect the lugs 18 to a member 20 of a collar 21 slidable on the shaft 10 and having a feather and spline connection therewith for rotation. The member 20 is shown as consisting of a disk and preferably forms a part of the collar 21. A ring 22 is fitted in an annular groove of the collar 21 and a rod 23 connected thereto extends to a convenient point of operation and is adapted to be secured in the required adjusted position by suitable fastening means. As shown, a bracket 24 receives the operating end portion of the rod 23 and the latter is provided with a plurality of teeth 25 to co-act with a stop 26 of the bracket, a spring 27 yieldably holding the toothed portion of the rod in engagement with the stop 26.

It will be understood from the foregoing taken in connection with the accompanying drawings, that the invention provides a propeller, the blades of which may be readily adjusted forwardly or rearwardly to any required angular position or to a neutral position whereby the propeller may rotate without imparting any movement to the aircraft in either direction. This results in a better control when starting, landing and in flight and the movement of the machine will be controlled without regulating the speed of the engine, it being necessary only to change the angle or pitch of the propeller blades which may be readily effected by movement of the control or operating rod 23.

What is claimed is:—

In a propeller, a shaft, a tubular cross head secured to said shaft, a retaining cap threaded on to each end of the cross head, a propeller blade at each end of the cross head, a flange on said blade located between the end of the cross head and the retaining cap, anti-friction bearing members arranged on each side of said flange, said retaining caps being adjustable to regulate the tension of the anti-friction bearings, and means to rotate said blades to adjust the angle thereof.

In testimony whereof I affix my signature.

JAMES A. WILLIAMS.